US009321502B1

(12) United States Patent
Xu

(10) Patent No.: US 9,321,502 B1
(45) Date of Patent: Apr. 26, 2016

(54) CONCEALED REAR WHEEL SUSPENSION DEVICE FOR A SCOOTER

(71) Applicant: Zhejiang Freedare Sports Equipment Co., Ltd., Hangzhou, Zhejiang (CN)

(72) Inventor: Yongqiang Xu, Zhejiang (CN)

(73) Assignee: Zhejiang Freedare Sports Equipment Co., Ltd., Hangzhou, Zhejiang (CN)

( * ) Notice: Subject to any disclaimer, the term of this patent is extended or adjusted under 35 U.S.C. 154(b) by 0 days.

(21) Appl. No.: 14/547,118

(22) Filed: Nov. 18, 2014

(51) Int. Cl.
*B62K 25/20* (2006.01)
*B62K 3/00* (2006.01)

(52) U.S. Cl.
CPC ................ *B62K 25/20* (2013.01); *B62K 3/002* (2013.01)

(58) Field of Classification Search
CPC ... B62K 25/20; B62K 3/002; B62K 2025/042
See application file for complete search history.

(56) References Cited

U.S. PATENT DOCUMENTS 4,186,934 A * 2/1980 Collings ...................... 280/221
4,429,760 A * 2/1984 Koizumi et al. .............. 180/215
4,540,192 A * 9/1985 Shelton ......................... 280/282
4,799,702 A * 1/1989 Wang ....................... 280/87.041
5,163,696 A * 11/1992 Pesco, Sr. ..................... 280/221
6,112,840 A * 9/2000 Forbes .......................... 180/193
6,227,324 B1 * 5/2001 Sauve ........................... 180/228
6,338,393 B1 * 1/2002 Martin .......................... 180/227
6,431,301 B1 * 8/2002 Forbes .......................... 180/185
6,668,959 B2 * 12/2003 McDermott et al. .......... 180/220
6,830,255 B2 * 12/2004 Cheng ...................... 280/87.041
2001/0030404 A1 * 10/2001 Liu ......................... 280/87.041
2002/0109314 A1 * 8/2002 Chen .......................... 280/14.28
2002/0109323 A1 * 8/2002 Darnell .................... 280/87.041
2002/0121756 A1 * 9/2002 Chen et al. ............... 280/87.041
2003/0085067 A1 * 5/2003 Martin .......................... 180/181
2004/0124599 A1 * 7/2004 Cheng ...................... 280/87.041
2005/0167168 A1 * 8/2005 Puzey .......................... 180/65.1

* cited by examiner

*Primary Examiner* — Laura Freedman

(57) ABSTRACT

A concealed rear wheel suspension device for a scooter comprising a frame component further comprising a frame cover, a frame and a stop fixedly connected to the rear of the frame, a suspension spring component further comprising a link, and a back fork; wherein a through hole is provided on two sides of the rear of the said frame, a threaded hole is provided on the upper surface of the said stop, two through holes are provided on the said frame cover corresponded to the said threaded holes; wherein a threaded end of the link sequentially crosses through the stop, a compression spring and a gasket, locked by a nut; wherein the back fork is rotatably connected to the frame through a bolt, and the a hole end of the link.

3 Claims, 2 Drawing Sheets

1 2 3 4 5 6 6 7 9 10 11 12

CONCEALED REAR WHEEL SUSPENSION DEVICE FOR A SCOOTER

TECHNICAL FIELD

The present application relates to a concealed rear wheel suspension device for a scooter.

BACKGROUND

Because the structure of scooter is simple and convenient for carrying, scooter has become many people's recreational sports and even travel tools. However, when the surface of the road is rugged, it will be uncomfortable for the user due to the impact of the vertical force. If there are large gaps in the road, the safety of user will be threatened. Additionally, the life expectancy of the scooter will be shorten. As a result, a suspension device between the wheels and the frame has been incorporated into some scooter designs to resolve the above problems. The existing designs of the suspension system are open and exposed, and their suspension effect is accomplished by the mutual movement of the parts of the suspension device by transforming the impact load. However, in such designs, the objects can be easily drawn into the exposed suspension device, impeding the relative motion of the parts in the suspension device, resulting in inadequate or no suspension effect by the suspension device.

SUMMARY

The present application is directed to a concealed rear wheel suspension device for a scooter, which is effectively ensure the safety of the scooter and increases comfort of the ride by the user. Additionally, the suspension also effectively increases the life expectancy of the scooter.

An embodiment of the present application provides a concealed rear wheel suspension device for a scooter comprising a frame component further comprising a frame cover, a frame and a stop fixedly connected to the rear of the frame, a suspension spring component further comprising a link, and a back fork; wherein a through hole is provided on two sides of the rear of the said frame, a threaded hole is provided on the upper surface of the said stop, two through holes are provided on the said frame cover corresponded to the said threaded holes; wherein a threaded end of the link sequentially crosses through the stop, a compression spring and a gasket with a hole in the middle of it, and the threaded end is locked by a nut; wherein two sets of holes are provided on the front end of the back fork along the vertical direction, wherein the upper holes are rotatably connected to the through hole on the two sides of the frame through a bolt, and lower holes are connected to a hole end of the link through a plug.

Preferably, a fitting groove for installing wheels is set on the rear end of the back fork.

Preferably, a retaining ring is provided on one end of the plugs.

It is to be understood that both the foregoing general description and the following detailed description are exemplary only and are not necessarily restrictive of the disclosure as claimed. The accompanying drawings, which are incorporated in and constitute a part of the specification, illustrate an embodiment of the disclosure and together with the general description, serve to explain the principle of the disclosure.

BRIEF DESCRIPTION OF THE DRAWINGS

Further features and advantages of the present device, as well as the structure and operation of various embodiments of the present device, will become apparent and more readily appreciated from the following description or the preferred embodiments, taken in conjunction with the accompanying drawing of which.

DETAILED DESCRIPTION

In the following detailed description, reference is made to the accompanying drawings that form a part hereof, and in which is shown by way of illustration specific implementations that may be practiced. These implementations are described in sufficient detail to enable those skilled in the art to practice the implementations, and it is to be understood that other implementations may be utilized and that logical, mechanical, electrical and other changes may be made without departing from the scope of the implementation. The following detailed description is, therefore, not to be taken in a limiting sense.

Figure 1:
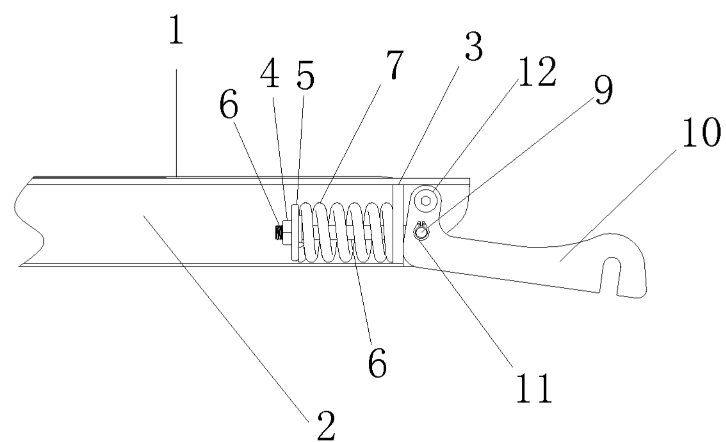
FIG. 1 is a structure diagram of a concealed rear wheel suspension device for a scooter according to the present application.
Figure 2:
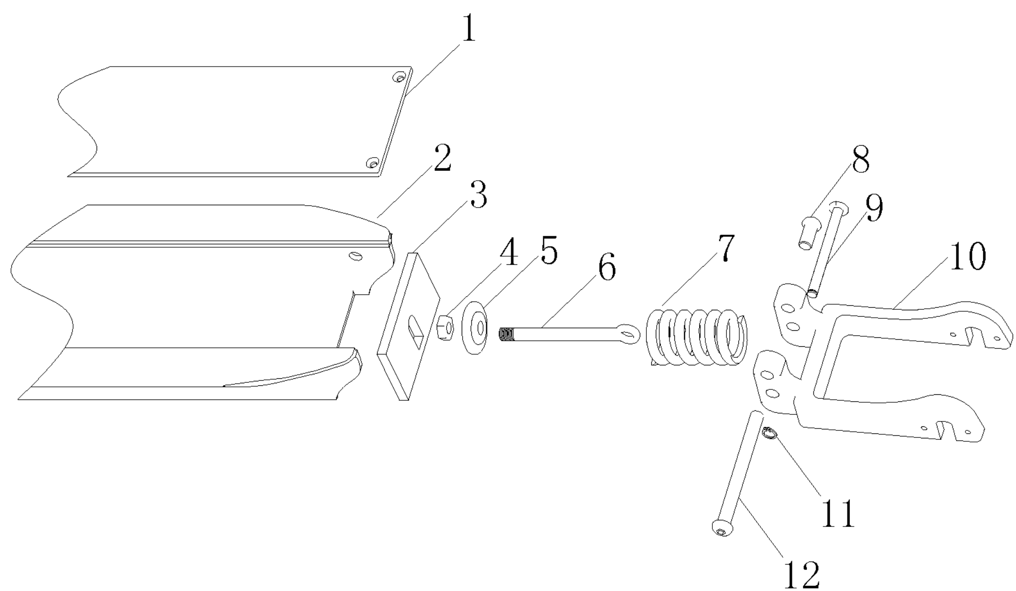
FIG. 2 is an exploded view of a concealed rear wheel suspension device for a scooter according to the present application.
Figure 3:
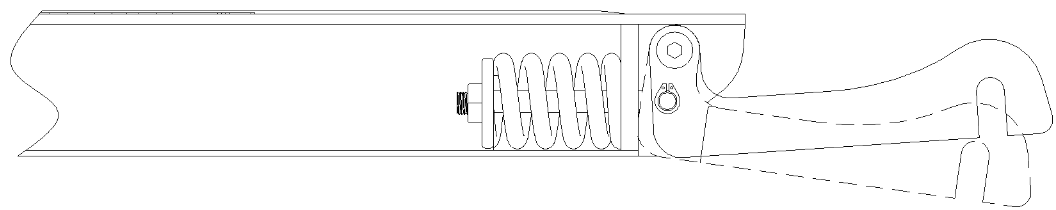
FIG. 3 is an illustration of the movement of the concealed rear wheel suspension device for a scooter according to the present application.
Figure 4:
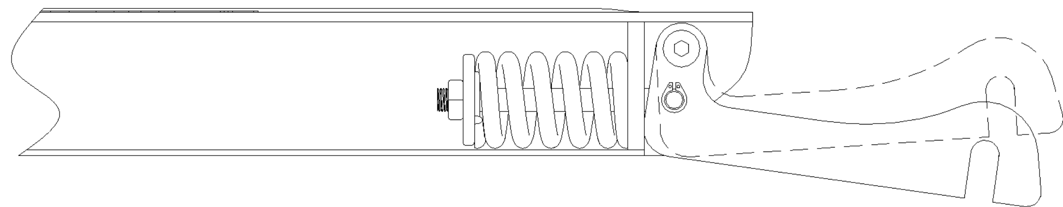
FIG. 4 is an illustration of the movement of the concealed rear wheel suspension device for a scooter according to the present application.

Referring to FIG. 1 to FIG. 4, present application provides a concealed rear wheel device for a scooter, which can comprise a frame component, a suspension spring component and a back fork. The frame component can further comprise a frame cover 1, a frame 2 and a stop 3 fixedly connected to the rear of the frame 2, a through hole is provided on each of the two sides of the rear of the frame 2, a threaded hole is provided on the stop 3, wherein two through holes are provided in the corresponding positions on the frame cover 1. The suspension spring component can further comprise a link 6 with a threaded end and a hole end, wherein the threaded end of the link 6 sequentially crosses through the said stop 3, a compression spring 7 and a gasket 5 with a hole in the middle of it, and a nut 4 to lock the threaded end; the back fork 10 can further comprise two sets of through holes along the vertical direction of the front end, wherein the upper holes are rotatably connected to the through hole on the two sides of the frame 2 through a bolt 12 and a screw 8, and wherein the lower holes are connected to the a hole end of the link 6 through plug 9 and retaining ring 11, and wherein the rear end of the back fork 10 provides a fitting groove to be used to install the wheels.

During its use, the concealed design of the suspension device completely blocks objects from entering the inside of the suspension device, ensuring relative motion of the parts of suspension device, and bringing into full play of the seismic performance of the suspension device.

When the scooter is driving on rugged terrain, the back fork 10 will receive the impact force from the rear wheel of the scooter, and the back fork component will rotate upward around the bolt 12 using link 6 to pull the compress spring 7. Consequently, the compress spring 7 is compressed, transforming the impact force along the vertical direction to reserve potential of the compress spring through the spring component. As a result, the frame 2 has only a slight movement in the vertical direction, thus effectively ease the impact force of the vertical direction.

When the terrain become relatively flat, the received impact force of the back fork 10 will revoke, and the reserve potential will force the link 6 to pull the back fork 10 forward. As a result, the back fork 10 then rotate downward around the bolt 12 to reset until the back fork 10 contacts with the stop 3 achieving seismic effect.

What is claimed is:

1. A concealed rear wheel suspension device for a scooter comprising:

a frame component further comprising a frame cover, a frame and a stop fixedly connected to a rear of the frame;

a suspension spring component further comprising a link; and a back fork;

wherein a through hole is provided on two sides of the rear of the frame, a threaded hole is provided on an upper surface of the stop, two through holes are provided on the frame cover corresponded to the threaded hole; wherein a threaded end of the link sequentially crosses through the stop, a compression spring and a gasket with a hole in the middle of the gasket, the threaded end is locked by a nut; two sets of holes are provided on a front end of the back fork along a vertical direction, wherein upper holes are rotatably connected to the through hole on the two sides of the frame through a bolt, and lower holes are connected to a hole end of the link through a plug.

2. The concealed rear wheel suspension device for a scooter as described in claim 1, wherein a fitting groove for installing wheels is set on the rear end of the back fork.

3. The concealed rear wheel suspension device for a scooter as described in claim 2, wherein a retaining ring is provided on one end of the plug.

* * * * *